Figure 12:
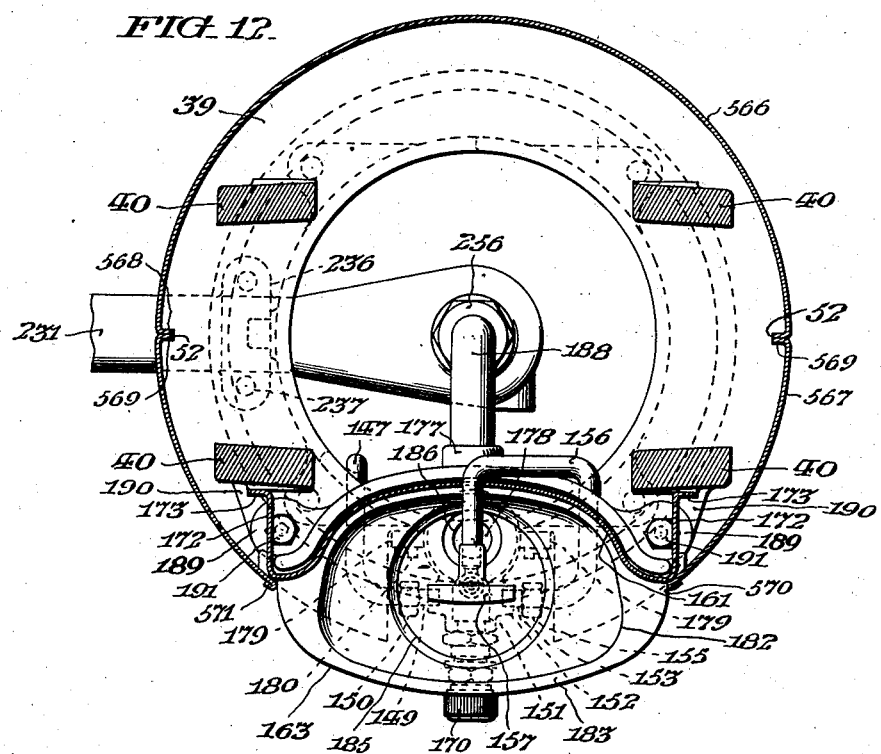

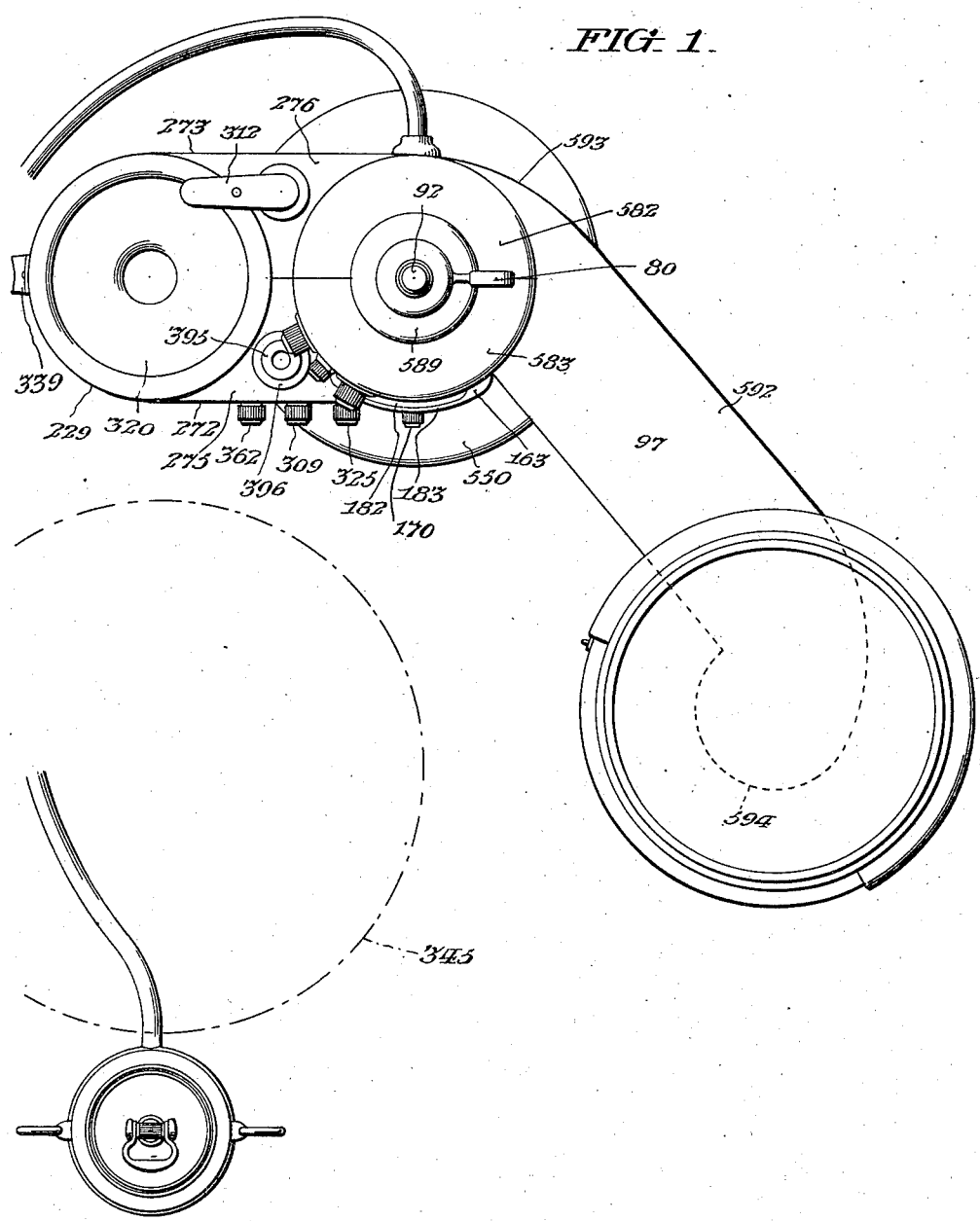

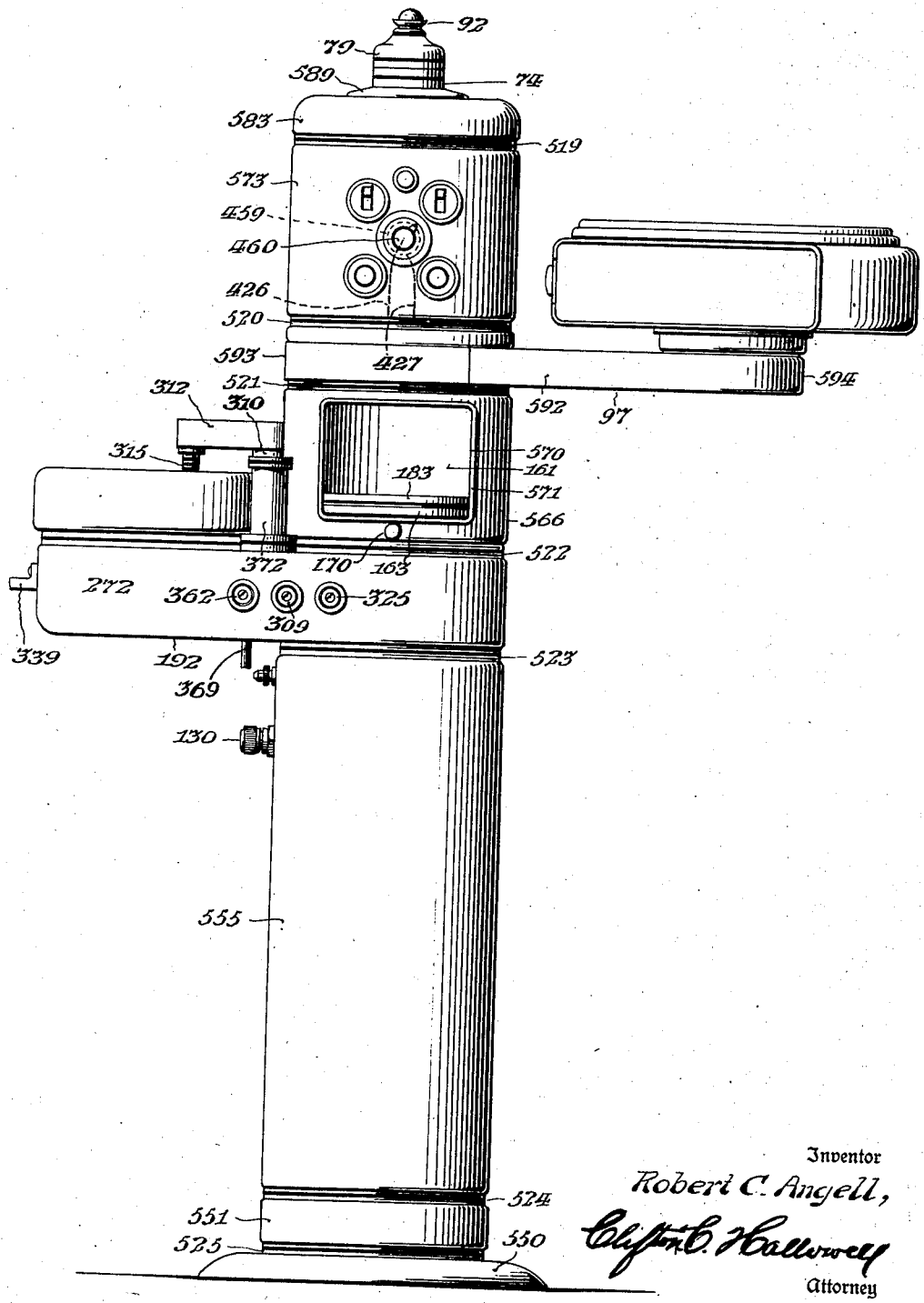

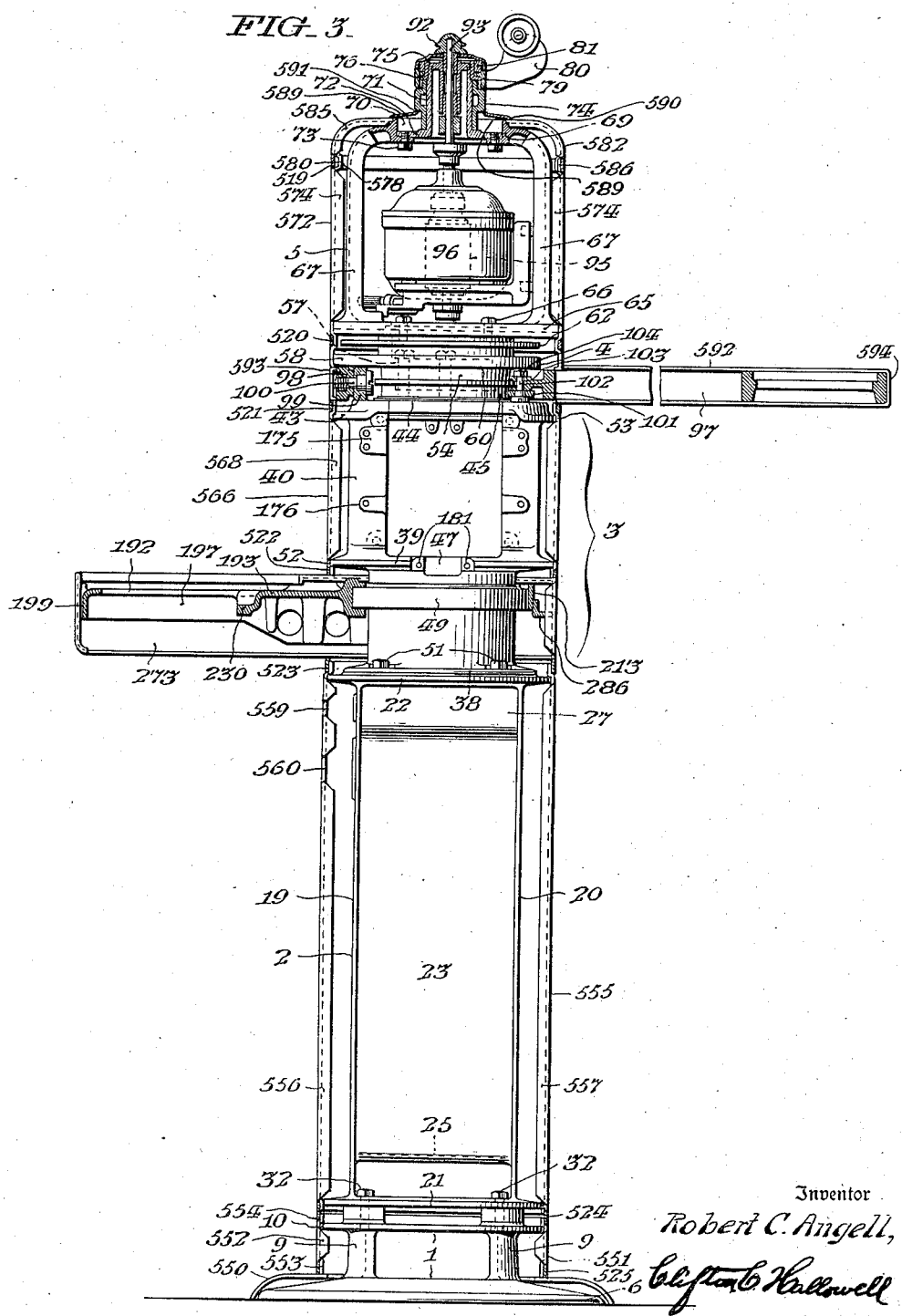

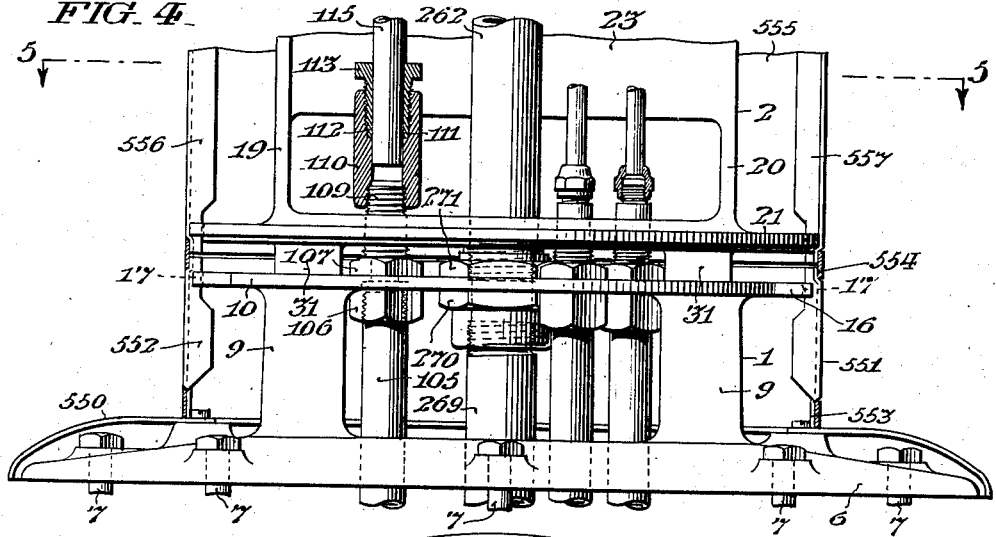
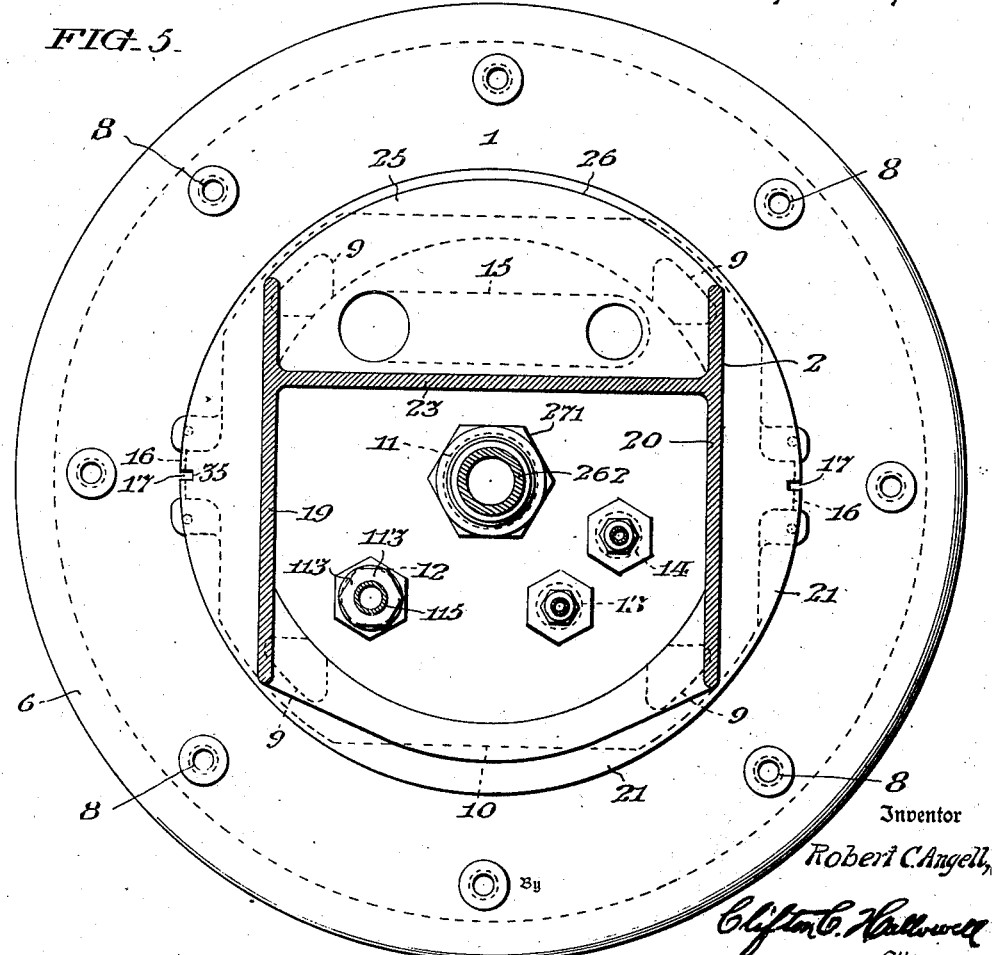

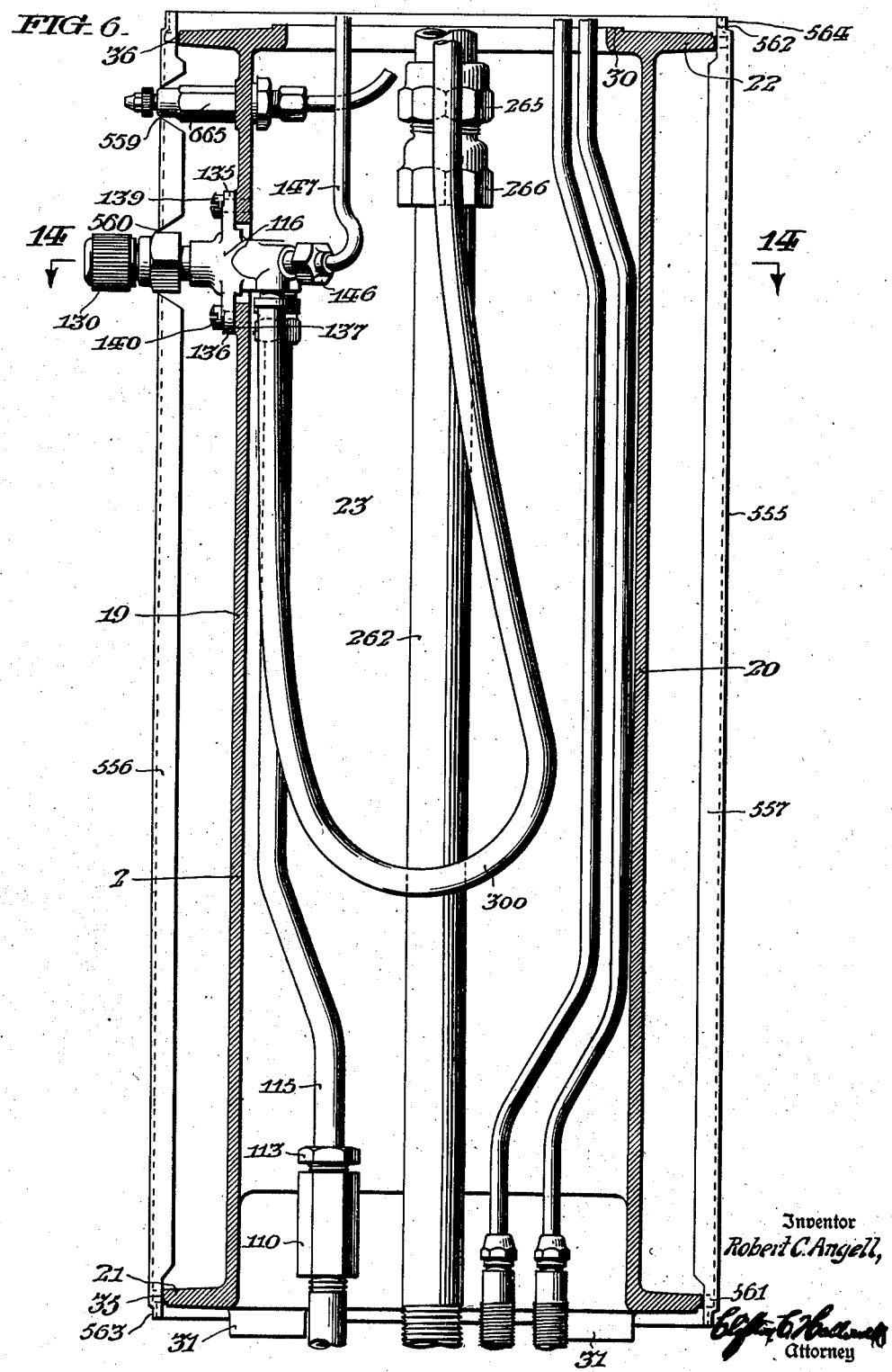

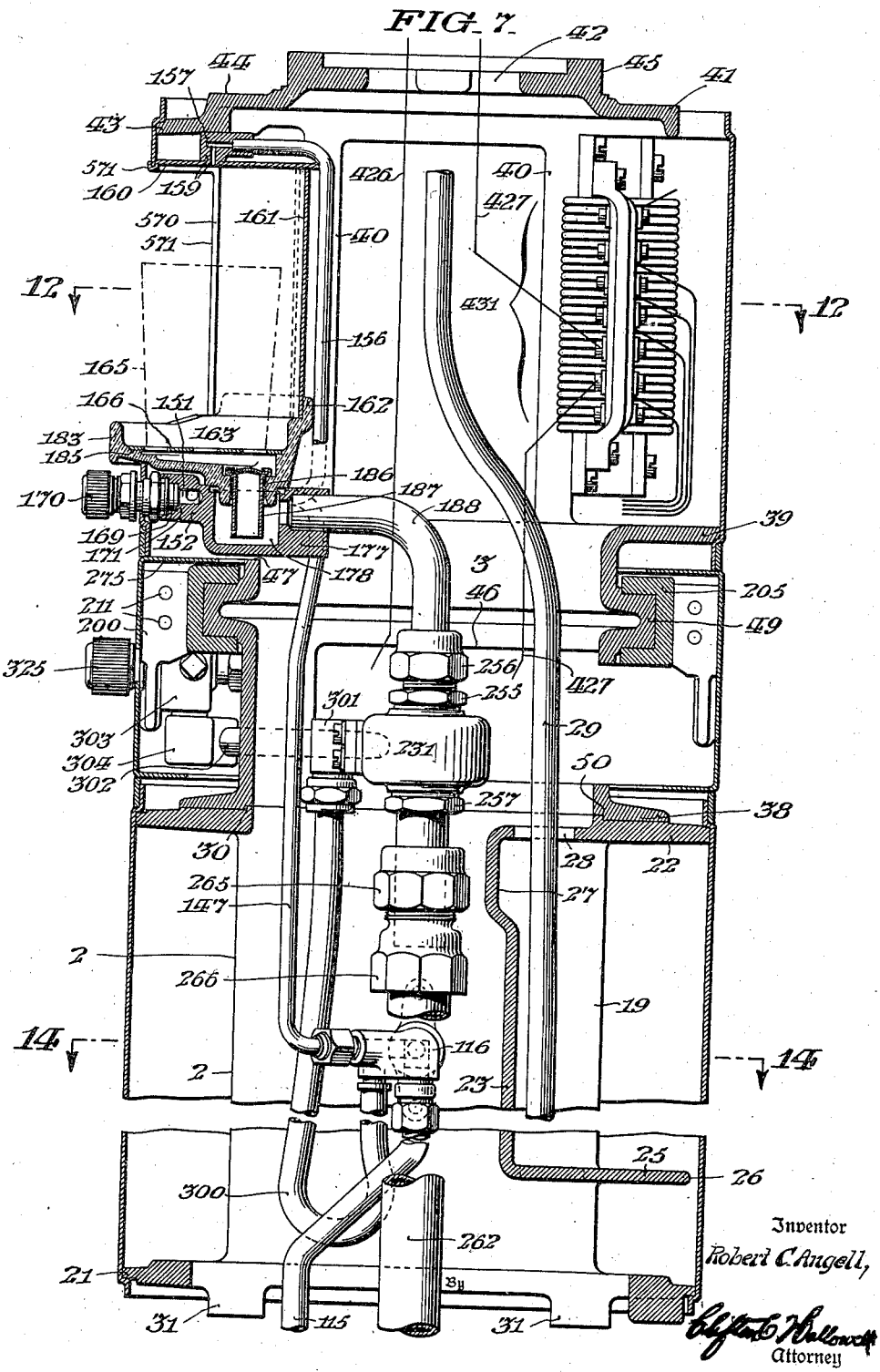

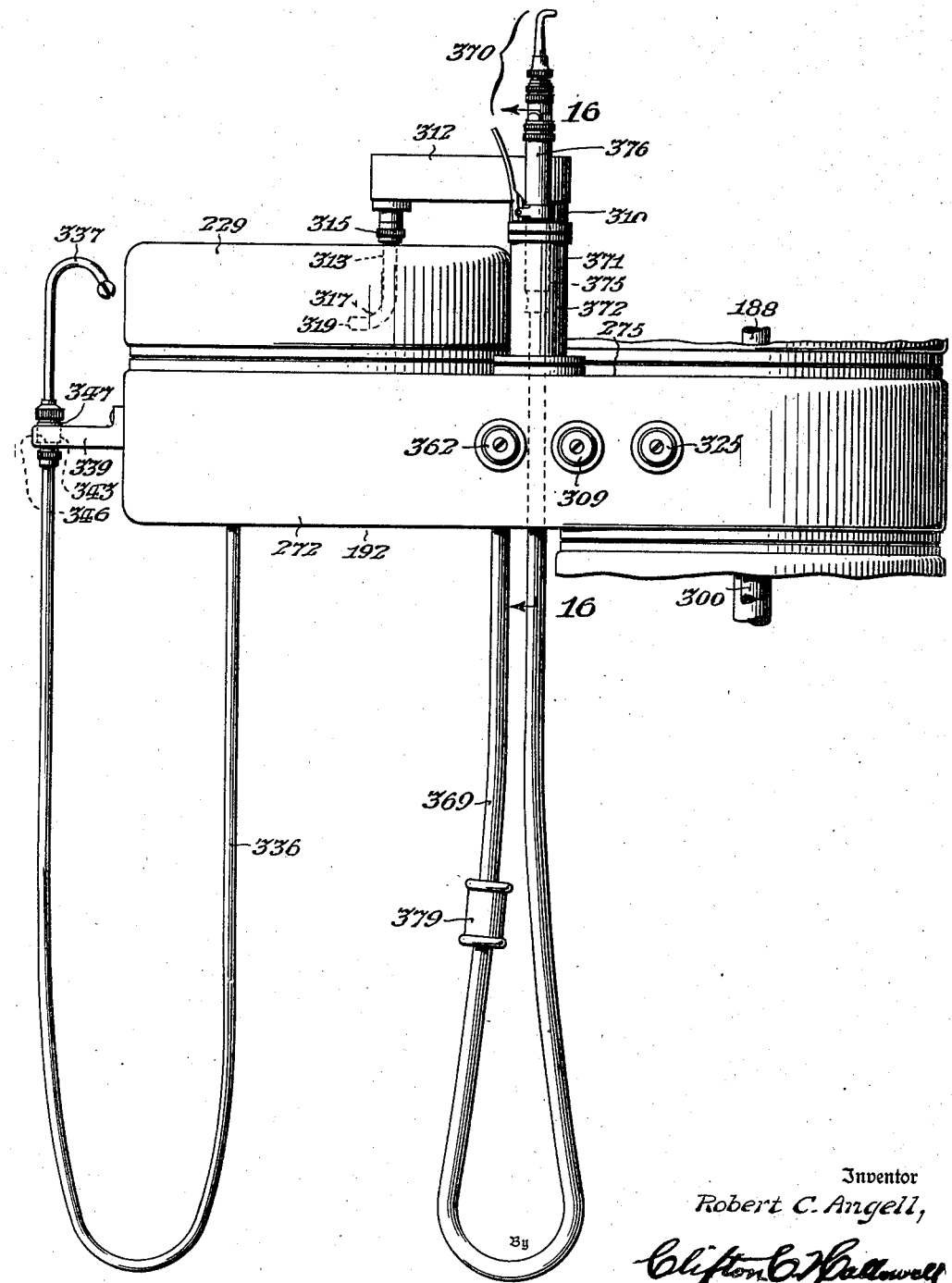

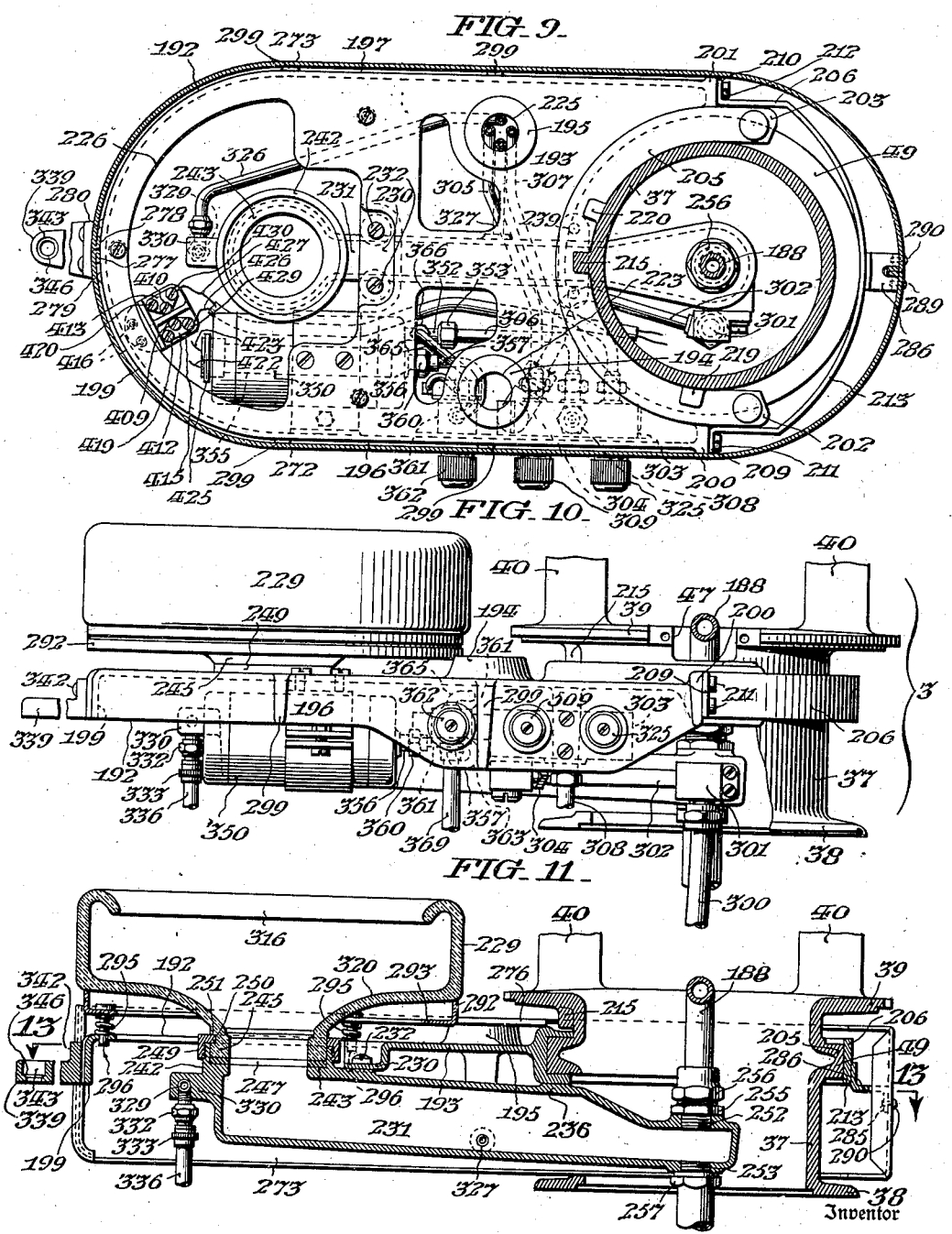

Inventor
Robert C. Angell,
By Clifton C. Hallowell
Attorney

March 20, 1945.      R. C. ANGELL      2,371,597
DENTAL EQUIPMENT STAND
Original Filed April 5, 1939    10 Sheets-Sheet 10
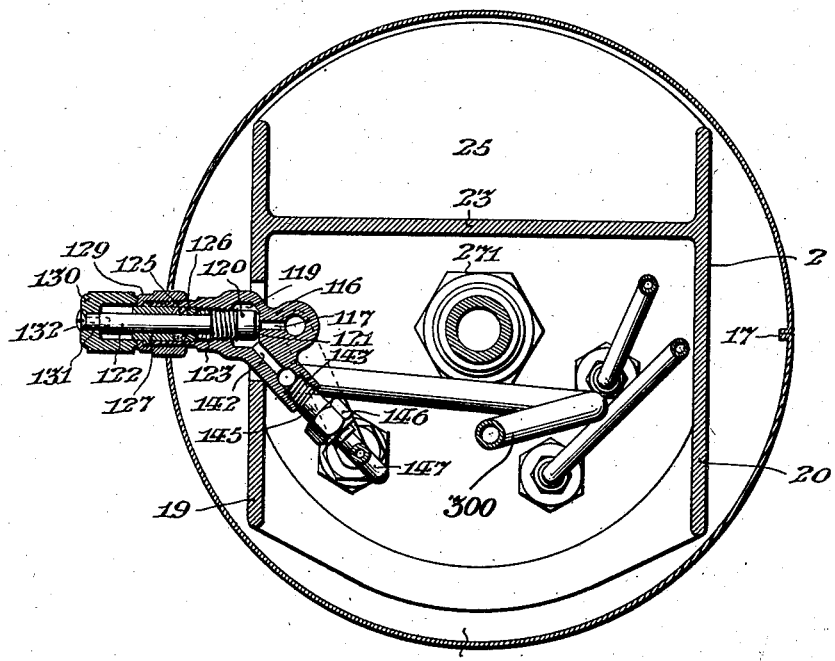
Inventor
Robert C. Angell,
By
Clifton C. Hallowell
Attorney Patented Mar. 20, 1945

2,371,597

UNITED STATES PATENT OFFICE 2,371,597

DENTAL EQUIPMENT STAND

Robert C. Angell, Prince Bay, N. Y., assignor to The S. S. White Dental Manufacturing Company, a corporation of Pennsylvania Original application April 5, 1939, Serial No. 266,174. Divided and this application October 27, 1942, Serial No. 463,474

6 Claims. (Cl. 32—22)

This application constitutes a division from my copending application Serial No. 266,174, filed April 5, 1939, which issued into Patent No. 2,317,971, May 4, 1943, and is specifically directed to the cuspidor and its associated mechanism.

My invention relates particularly to that class of dental equipment assemblages that are adapted to be located adjacent to a dental operating chair and arranged to support, within easy reach of the operator, various instruments, implements, appliances and devices employed in the practice of dentistry, and is especially directed to its simplified construction, easy accessibility of its enclosed mechanism, wide range of relative movement of the associated parts, and the consequent flexibility in the use of such instruments.

The principal objects of my invention are to provide an assemblage of dental equipment devices embodied in stand or pedestal that is compact, pleasing in appearance, convenient to operate, readily assembled and taken apart and that affords a maximum degree of utility in the practice of the dental profession.

Other objects of my invention are to provide an equipment assemblage comprising a standard or pedestal upon which various relatively adjustable equipment and dental devices may be conveniently moved into relatively different operative positions about the common axis of said standard or pedestal.

Further objects of my invention are to provide a dental equipment stand assemblage in which the frame of the supporting standard is composed of a plurality of frame sections relatively superposed one upon another and secured together to form a supporting skeleton standard structure upon which the various equipment devices may be adjustably supported, and in which a shell or casing is formed of a plurality of casing sections having means cooperative with complementary means on said frame sections to cause said casing sections, when forced into their relative normal positions to closely embrace and enclose the assembled skeleton frame to form a pedestal structure or standard.

Other objects of my invention are to provide a dental equipment stand having a dental engine mechanism including the swingable arm and supporting collar mounted thereon and arranged to be swung about the vertical axis of said stand, and having its operative parts connected to be driven by a motor having its axis of rotation normally common to the axis of said stand and engine mechanism.

My invention also includes a dental equipment stand or pedestal having a cuspidor mounted to swing horizontally about the axis of said pedestal and having its waste water outlet connected by a swivel joint with a waste water pipe disposed in coaxial relation with the stand or pedestal, and having a water niche in the wall of said pedestal providing convenient space for a drinking glass or tumbler and a superposed faucet for directing water into said tumbler, both being disposed in an alcove within the circumferential outer surface of the pedestal shell sections or casing and protected by the walls of said niche from any stray splashes that may be accidentally deflected from the spittoon bowl.

My invention further includes an equipment stand assemblage having a bracket table rotatably supported on a swingable supporting arm which is mounted for horizontal movement about the axis of said stand and including a frame carrying connection terminals for gas and air which are connected by flexible tubing spirally coiled about the common axis of said swingable supporting arm and stand with suitably disposed stationary connecting terminals of gas and air conveying pipes extending upwardly through the stand or pedestal.

Specifically stated, the form of my invention as hereinafter described, comprehends an equipment stand comprising a pedestal of generally cylindrical formation having a flanged base and a dome-like upper extremity from which projects a cylindriform engine mechanism mounting, and having horizontally swingable arms disposed at relatively different levels and respectively carrying a bracket table and a cuspidor. Said pedestal is preferably formed of a plurality of separable frame sections each designed to provide specifically for its intended purpose and assembled one upon another in a prescribed order and secured together with their respective axes coincident with the axis of the thus assembled standard which provides a supporting frame standard that may be enclosed by a plurality of readily removable and replaceable substantially semicylindrical casing sections preferably of sheet material assembled to form the cylindriform pedestal structure. The swingable arms for the bracket table and cuspidor are provided with suitably formed casing sections of sheet material which have their inner semicylindrical ends in coincident alinement with the cylindrical wall formed by the adjacent casing sections and serve to form therewith the complete shell or closure for the above described assembled supporting standard, and providing the cylindriform pedestal structure as illustrated.

My invention also includes all of the various novel features of construction and arrangement as hereinafter more definitely specified.

Figure 13:
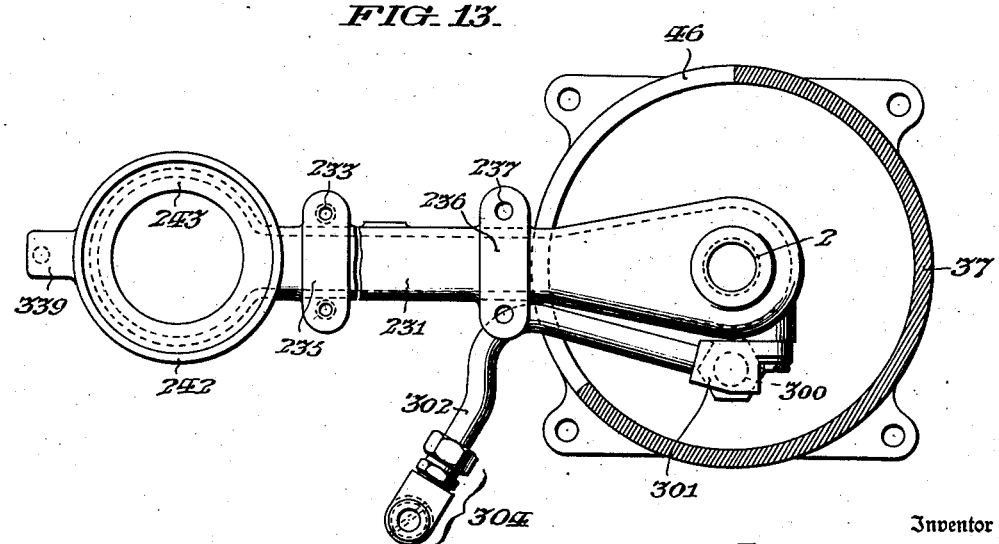

In the accompanying drawings, Figure 1 is a plan view of the equipment stand assemblage showing the foot controller and its relation to the operating chair; Fig. 2 is a front elevational view of the equipment stand shown in Fig. 1; Fig. 3 is a front elevational view of said equipment stand with the front casing members removed and showing the bracket table arm and spittoon arm in section; Fig. 4 is a fragmentary front elevational view of the base frame section and a fragment of the lower portion of the main frame section and showing the inlet and waste pipes extended therethrough with certain portions thereof indicated in section; Fig. 5 is a plan sectional view of the structure assemblage shown in Fig. 4 as indicated on the line 5—5 in said figure, the casing sections shown in Fig. 4 being omitted from Fig. 5 for convenience of illustration; Fig. 6 is a central vertical sectional view of the main body frame section showing the piping connections extended therethrough and including the water inlet valve and condensate relief valve; Fig. 7 is a central vertical sectional view showing upper and lower fragments of the main body frame section and the superposed cuspidor frame section and water niche frame section; Fig. 8 is a side elevational view of the cuspidor arm together with fragments of the pedestal associated therewith, and showing mounted thereon the warm water syringe with its flexible connector, the saliva ejector with its flexible connector, and the flush mechanism with its nozzle; Fig. 9 is a plan view of the cuspidor arm and its mounting the cuspidor arm frame section, said mounting and the casing for the cuspidor arm being shown in section for convenience of illustration; Fig. 10 is a side elevational view of the cuspidor arm with the cuspidor mounted thereon, together with a fragment of the cuspidor mounting frame which is shown partly in section for convenience of illustration; Fig. 11 is a vertical longitudinal sectional view taken axially through the cuspidor mounting frame and the cuspidor arm and bowl mounted thereon; Fig. 12 is a plan sectional view taken through the water niche section on the line 12—12 in Fig. 7, and showing a fragment of the cuspidor drain conduit; Fig. 13 is a plan sectional view taken on the line 13—13 in Fig. 11, the cuspidor drain conduit and certain associated parts being shown in plan view for convenience of illustration; Fig. 14 is a horizontal sectional view of the main body section taken through the main water control valve on the line 14—14 in Figs. 6 and 7; Fig. 15 is a central longitudinal vertical sectional view of the warm water syringe holder which is shown mounted on the cuspidor arm in Fig. 8, the upper portion being shown in elevation for convenience of illustration; and Fig. 16 is a transverse vertical fragmentary sectional view taken through the cuspidor arm on the axial plane of the warm water syringe holder and showing its means of attachment, the plane of said section being normal to the plane of the section shown in Fig. 15 and taken on the line 16—16 in Fig. 8.

In said figures the frame forming the supporting standard comprises the base section 1, the main body section 2, the combined water niche and cuspidor section 3, accessory table-arm section 4 and the dome or motor section 5, all being assembled by building one upon the other about a unitary common vertical axis in the order named to provide a skeleton standard structure upon which the various operating appliances, devices and parts, to be hereinafter described, may be mounted for convenient utilization.

The base section 1 is provided with the enlarged base flange 6 adapted to rest upon the floor and to be secured thereto by the bolts 7 extended through suitably spaced apertures 8, and has four upwardly extending legs 9, terminating in a substantially octagonal perforated elevated plate or platform 10, having the circular apertures 11, 12, 13 and 14, and the elongated aperture 15, through which piping and electrical conduits may extend, said platform 10 being provided with two diametrically opposite outwardly projecting lugs 16 each having a vertical notch or slot 17 cut or otherwise formed therein, and indented for a purpose to be hereinafter described.

Superposed upon the base section 1, is the main body section 2 which comprises the relatively spaced parallel plane side walls 19 and 20 respectively terminating at their lower ends in the annular horizontally extended flange 21 and at their upper ends in the annular horizontally extended flange 22, and being joined vertically by the transverse wall 23 which is inset from the edges of said walls 19 and 20 but preferably disposed nearer to the rear edges of said walls, as shown in Figs. 5 and 7.

The transverse wall 23 terminates short of the annular flange 21 and merges into the horizontally extended shelf 25 projecting rearwardly from the lower end of said transverse wall 23 and having its curved free edge 26 joining the free vertically disposed rear edges of the side walls 19 and 20, as shown in Figs. 3 and 5.

Said transverse wall 23 is slightly offset at 27, its upper portion, see Fig. 7, and merges horizontally into the flange 22, the horizontal portion being provided with the aperture 28 for the convenient passage of an electrical conduit 29 therethrough, as shown in Fig. 7, which conduit is adapted to direct electric line wires from a suitable source of supply to the distributing mechaanism not shown, but which is arranged to be disposed in the upper dome section 5. Said flange, as shown in Figs. 6 and 7, is provided at its inner edge with the upwardly extending rectangular rim bead 30.

The main body section 2 is supported on the base section 1 and has the four feet 31 which depend from the under surface of the annular flange 21 in relatively spaced relation and rest upon the plate or platform 10 of base section 1 to which the main body section 2 is rigidly secured by the bolts 32, shown in Fig. 3.

The flanges 21 and 22 of the main body section 2 are provided in their outer peripheral edge with the diametrically opposite vertically disposed slots or notches 35 and 36 respectively which afford attachment of the casing members, as will be hereinafter described.

The combined niche and cuspidor mounting section 3 is superposed upon the main body section 2 and comprises a unitary structure having the cylindriform wall 37 provided with a lower annular horizontal flange 38 resting upon the upper flange 22 of said main body section 2, a medial flange 39 from which rise the four posts or standards 40 terminating upwardly in the top plate or cap 41 unitary therewith and having a central aperture 42 and flange 43, and providing a circular horizontal track 44 and a cylindrical vertical track 45 for supporting bearing structure to be later described.

The cylindriform wall 37 of the water niche and cuspidor mounting section 3 is provided with the apertures 46 and 47 and has the annular rectangular bearing rib 49 in the form of an outwardly projecting encircling band interposed between the flanges 38 and 39, but more closely adjacent to the latter.

As best illustrated in Fig. 7, the annular flange 38 is provided with the rabbet 50 arranged to receive the rim bead 30 on the flange 22 of the main body section 2, and said flange 38 is rigidly secured to said flange 22 by the bolts 51, as shown in Fig. 3. The flanges 39 and 43 are each provided in their peripheral edges with diametrically opposite notches or slots 52 and 53 respectively, the purpose of which will be later referred to.

The accessory table arm section 4 is superposed upon the water niche and cuspidor mounting section 3, and comprises a hollow circular hub 54, provided with the horizontal flange 58 disposed intermediate of its axial length and providing a flat horizontal under surface affording a circular roller bearing track 60 in suitably opposed spaced relation to the circular track 44 on the cap 41. The upwardly extending portion of said hub 54 is arranged to support the annular shelf 62, and is secured to the section 3 by the bolts 57, see Fig. 3.

The motor section 5 is superposed upon the accessory table-arm section 4 and serves as a crown-piece or dome for the skeleton standard structure thus assembled. Said motor section 5 comprises the annular floor 65 resting on the circular hub 54, and to be secured thereto by the bolts 66, shown in Fig. 3, and from which floor 65 rise the diametrically opposite U-shaped standards 67 respectively curving inwardly at their upper extremities and merging into the annular head 69 forming a pocket 70 arranged to receive specially designed dental engine mounting structure.

The engine arm mounting structure includes the engine arm support comprising the cylindrical hub 71 disposed coaxially with the axis of the assembled standard structure, and having the horizontally disposed flange 72 engaged in the pocket 70 in rigid relation to the motor section 5 by the bolts 73, as best illustrated in Fig. 3.

The hub 71 of the engine arm support is normally encircled by the spacer sleeve 74, above which the engine arm bearing 75 having the radially extending horizontal bearing flange 76 is disposed in threaded engagement with the upper extremity of the hub 71.

The engine arm bearing 75 supports for rotatable movement, the inwardly flanged swivel ring 79 of the engine arm base from which the engine arm supporting bracket 80 projects radially and slightly upward, and said swivel ring 79 is retained in rotatable relation to the bearing 75 by the nut 81 in threaded engagement with the upper portion of said bearing 75. The swivel ring 79 and its engine arm supporting bracket 80 is adapted to carry the dental engine, of well known construction, but not herein illustrated.

The mode of actuating the dental engine driving pulley 92 differs widely from that heretofore employed in that the driving pulley 92 is carried by the driving pulley extension shaft 93 which is coaxial with the armature 95 of the electric motor 96, and with the vertical axis of the pedestal in the dome of which the electric motor is mounted.

The accessory table arm 97 is adapted to oscillatably swing horizontally about the unitary axis of the standard structure upon which it is supported and comprises the substantially semicircular bearing mounting 98, the rim of which embraces the hub 54 in concentric relation thereto, and as best illustrated in Fig. 3, the table arm 97 is supported for horizontal movement into different positions convenient to the operator, by the supporting rollers 99 respectively mounted on the headed trunnions 100, which project inwardly from the bearing mounting rim 98.

In order to retain the accessory table arm 97 in axial registry with the supporting standard structure or pedestal, it is provided with the horizontally disposed equally spaced rollers 101 arranged to traverse the cylindrical track 45, the rollers 101 with their axes of rotation in a vertical plane and journalled to rotate on the headed shaft 102 which, as shown in Fig. 3, extends through an aperture in the boss 103 on the bearing mounting 98, and which is engaged in stationary relation therewith by the nut 104 threaded thereon. Thus it will be seen that the accessory table arm 97 may freely revolve about the axis of the standard structure and be moved into any desired position convenient to the operator.

Water supply to the water niche, cuspidor and various water dispensing devices is directed into the pedestal through the water supply pipe 105, see Fig. 4, which extends upwardly through the floor and into the base section 1 and is secured to the base platform 10 by the fitting 106 and nut 107 and which terminates in a reduced threaded projection 109 to which a coupling 110 is threadedly attached.

Said coupling 110 comprises the stuffing box 111 containing the packing 112 and the gland nut 113 through which the lower end of the pipe 115, which conveys water through the pedestal, extends and by which it is connected in watertight relation to the water supply pipe 105.

The water pipe 115 extends upwardly through the pedestal and is connected with the main water controlling valve 116 which, as best shown in section in Fig. 14, comprises the inlet passageway 117 leading into the valve chamber 119 and controlled by the valve plug 120 which is arranged to cooperate with the valve seat 121, and which has the valve stem 122 in threaded engagement with the bore 123 of the body of said valve 116.

Said valve stem 122 extends through the packing 125 of the stuffing box 126 including the gland 127 and gland nut 129 and is provided with the controlling handle or knob 130 which is engaged on the squared end 131 of said stem 122 by the knob retaining screw 132.

As shown in Figs. 6 and 14, the body of the valve 116 extends through a suitably provided aperture in the side wall 19 of the main body section 2 of the supporting standard and has the wings 135 and 136, see Fig. 6, which are secured to the annular boss 137 on said side wall 19 by the tap screws 139 and 140.

As shown in Fig. 14, said valve 116 has the passageway 142 connected with the valve chamber 119 and extending through the internally threaded spout 143 to which the threaded nipple 145 is attached. The nipple 145 is connected by the coupling-fitting-nut 146, of well known construction, with the water niche supply pipe 147 which extends upwardly through the pedestal, see Fig. 7, and is connected, as best shown in Fig. 12, through the nipple 149 and its coupling-fitting-nut 150 with the valve chamber 151 in the water niche controlling valve 152.

The valve chamber 151, as best illustrated in Fig. 7, is connected, as best shown in Fig. 12, by the nipple 153 and its coupling-fitting-nut 155 with the pipe 156 extending upwardly through the water niche and cuspidor section 3 to the water niche spigot 157 which has its spout 159 directed downwardly through the ceiling 160 of the water niche formed by the concave wall 161 which substantially conforms to the upwardly extending rear flange 162 of the water niche basin 163, said spigot being positioned to direct water into the water glass or tumbler 165 which rests upon the removable water niche drain cover plate 166, said tumbler being illustrated by dot-and-dash lines for convenience of illustration.

Flow of water through the spigot 157 into the water niche is controlled by the valve plug 169 which is manually actuated by turning the outwardly projecting knob 170 and which cooperates with the valve seat 171 upon the opposite sides of which the pipes 147 and 156 connect with the valve chamber 151, the inlet pipe connecting through the nipple 153 with said valve chamber 151 forward of the valve seat 171, see Fig. 7, and the outlet pipe 156 being connected through the nipple 159 with the valve chamber 151 rearward of said valve seat 171, as illustrated in Figs. 7 and 12.

As best shown in Fig. 12, the concave wall 161 has its lateral margins 172 extended rearwardly in relatively parallel planes and respectively turned outwardly to form laterally directed flanges 173 which provide means for attaching said wall 161 to the bosses 175 and 176, see Fig. 3, on the forward posts or risers 40 of the water niche and cuspidor mounting section 3.

The water niche controlling valve 152 includes a rearwardly extending enlarged body 177 provided with a drain pocket 178 having the laterally extended wings 179 by which said valve 152 is attached to the water niche and cuspidor mounting section 3, and supported in the recess 47 by the screws 180 engaged in the threaded apertures 181.

The water niche basin 163 may preferably be formed of glass or other suitable material having a transversely elongated dished recess 182 forming the forward rim 183 as illustrated in Figs. 7 and 12, and having the counter recess forming the annular seat 185 arranged to receive the drain cover plate 166, beneath which depends the water niche basin drain outlet 186 directed into the drain pocket 178 from which waste water is directed through the noise prevention trap 187 and the pipe 188.

Said water niche basin 163, as illustrated in Fig. 12, is provided with wings 189 extending outwardly from its ends and resting upon the lugs 190 projecting forwardly from the forward posts or risers 40 of the water niche and cuspidor mounting section 3, and said basin is secured thereto by the tap bolts 191.

The cuspidor supporting arm 192 is arranged to revolve horizontally about the vertical axis of the composite supporting standard, and is mounted for support upon the component water niche and cuspidor mounting section 4, see particularly Figs. 3, 8, 9, 10 and 11.

Said cuspidor supporting arm 192 comprises the frame having the substantially flat horizontal plate 193 provided with the bosses 194 and 195 and merging at its perimeter into the depending apron forming the side walls 196 and 197 connected forwardly by the semicylindrical end wall 199 at the outer free end thereof and terminating inwardly or rearwardly in the abutments 200 and 201 disposed upon the diametrically opposite end portions 202 and 203 of the concave semi-annular channeled inner rim 205 of said frame plate 193.

As best shown in Figs. 7, 9 and 11, the channeled rim 205 is fitted to closely embrace the bearing rib 49 encircling the water niche and cuspidor mounting section 3 being free however to slide thereon to permit the cuspidor arm to revolve thereabout, and said rim 205 is maintained in proper engagement with said rib 49 which provides a supporting track therefor, by the strap 206 preferably formed of spring metal and having its end margins turned outwardly, see Fig. 9, to form attaching lugs 209 and 210 abutted against the cuspidor frame abutments 200 and 201 and engaged therewith by the screws 211 and 212, the intermediate bowed portion 213 of said strap engaging the outer cylindrical surface of the rib 49, as best shown in Figs. 9 and 11.

As illustrated in Fig. 9, the swinging movement of the cuspidor arm 192 is limited to about ninety degrees by the stop lug 215 which projects radially from the cylindrical wall 37 of the water niche and cuspidor mounting section 3, into the path of the lugs 219 and 220 which project upwardly from the upper horizontal wall of the semi-annular rim 205.

As best shown in Fig. 9, the frame plate 193 is provided with the aperture 223 extended through the boss 194 and the aperture 225 extended through the boss 195, and said plate 193 is also provided with the opening 226 through which the cuspidor 229 may be connected with the drain or waste outlet, and said plate is recessed downwardly centrally along the inner edge of said opening 226 to provide the attaching shelf 230 to which the cuspidor drain conduit 231 is secured by the screws 232, see Figs. 9 ad 11, in engagement with the threaded apertures 233 in the winged attaching pad 235, see Fig. 13.

As shown in Figs. 9, 12 and 13, the drain conduit 231 is provided with the winged attaching pad 236 having the apertures 237 through which screws 239 extend in threaded engagement with the lower horizontal wall of the semi-annular rim 205.

At the forward end, said cuspidor drain conduit 231 is provided with the externally threaded upwardly extended nipple 242 providing an inset annular shoulder 243 upon which the hub 245 of the cuspidor bowl 229 rests with the interposed annular gasket 247 of water resistant resilient material, which is compressed to insure a watertight seal by the annular nut 249 having the inturned flange 250 engaged with the groove 251 in the outer cylindrical wall of said hub 245.

The inner end of the cuspidor drain conduit 231 curves about the axis of the supporting standard and has the threaded apertures 252 and 253 respectively in its upper and lower walls and coaxial with said standard axis, the uppermost aperture 252 being provided with a nipple fitting 255 to which the water niche drain pipe 188 leading from the water niche basin drain pocket 178 is attached by the connection unit 256 in a well known manner, the lowermost aperture 253 being provided with a nipple fitting 257 which is connected by the fittings 265 and 266 with the drain or waste pipe 262, as illustrated in Fig. 7.

The drain or waste pipe 262 extends downwardly through the supporting standard preferably being coaxial therewith and is connected with the drain or waste outlet pipe 269 which extends upwardly through the floor and into the base section 1, as shown in Fig. 4. The opposed ends of said drain or waste pipes 262 and 269 are secured for firmness to the platform 10 of the base section 1 by the fitting 270 and nut 271 and convey the waste drainage from the cuspidor bowl 229 and water niche basin 163.

As shown in Figs. 8, 9 and 11, the cuspidor supporting arm includes a readily removable and replaceable casing comprising the half-sections 272 and 273 having their respective horizontal top walls 275 and 276 and their respective inturned edge margins abutted along a vertical plane passing through the axis of the supporting standard including the frame section 3 and the cuspidor 229, and being retained in any suitable manner, such, for instance, as shown in Fig. 9 wherein the forward or left hand ends of said half-sections have their inturned edge margins 277 and 268 respectively engaged between the lugs 279 and 280, while the inner or right hand ends of said half-sections have their inturned margins engaged with the depending extension 285 of the bracket 286 which extends outwardly from the strap 206, see Figs. 9 and 11, and to which said half-sections are engaged by the screws 289 and 290.

As best shown in Fig. 11, the cuspidor supporting arm 192 carries the annular band 292 having its inturned flange 293 supported on the flat horizontal frame plate 193 by the suitably spaced springs 295 which encircle the headed posts 296 in threaded engagement with the plate 193. Said band 292 is forced upwardly by said springs 295 to engage its upper edge with the under surface of the cuspidor bowl 229 and to thereby close the space between the cuspidor and upper edge of the casing comprising the half-sections 272 and 273.

As shown in Figs. 9 and 10, the side walls of the casing sections of the cuspidor supporting arm are maintained in proper spaced relation by the abutments 200 and 201 and by the vertically extending ribs 299.

The valve 116 is connected by the flexible tube 300 with the fitting 301 which is secured to the drain conduit 231, and which is connected by the pipe 302 with the valve body 303 by the coupling 304. Water distribution to the several parts and implements carried by the cuspidor supporting arm is effected through the valve block or body 303 from which water is conveyed through the pipe 305 to the cuspidor, through the pipe 306, to the water heater, and through the pipe 307 to the saliva ejector, as will be later described.

Water that is conveyed from the valve body 303 through the pipe 305 is controlled by a combination valve-plug and seat of well known construction, which is arranged to be actuated by the valve controlling knob 309 to direct, retard or stop, as desired, the flow of water through said pipe 305 which is extended upwardly through the aperture 225 in the frame plate 193 and through the cylindrical upright housing 310 and extends horizontally through the pipe shielding arm 312 which is directed forwardly and at the free end of which the water conveying pipe 305 is connected to the cuspidor flush nozzle 313 by the swivel joint 315. As shown in Fig. 8, said flush nozzle 313 is directed downwardly into the cuspidor bowl 229 adjacent to the inturned edge 316 of said bowl and has its free end portion 317 curved into a horizontal outlet 319 so as to direct water spirally over the floor 320 of the cuspidor bowl 229.

Water that is conveyed from the valve body 303 through the pipe 307 is controlled by a valve-plug and seat of well known construction which is arranged to be actuated by the valve controlling knob 325 to control the flow of water to mechanism of water ejector type which may be housed within the cylindrical upright housing 310 and which is arranged to produce suction in the saliva conveying pipe 326 and effect discharge of saliva through the discharge pipe 327 into the cuspidor drain conduit 231.

The saliva conveying pipe 326, as shown in Fig. 9, is connected with a chamber 329 in the projection 330 which extends forwardly from the forward end of the cuspidor drain conduit 231, and said chamber is connected by the connection nipple 332 and fitting 333 through the flexible saliva conveying tube 336, see Figs. 8, 10 and 11, with the saliva ejector 337 which, as shown in Fig. 8, may be conveniently supported, when not in use, upon the saliva ejector bracket 339.

As shown in Figs. 1, 8, 9, 10 and 11, said bracket 339 projects outwardly from the forward end of the cuspidor supporting arm and is secured by the screws 342 to the forward semi-cylindrical end wall 199 of the apron that depends from the frame plate 193, of the cuspidor supporting arm, and said bracket 339, as shown in Figs. 9 and 11 has the circular aperture 343 through which the flexible tube 336 is adapted to extend when the saliva ejector is lifted and drawn outward by the operator to be inserted into the mouth of the patient that may be seated in the chair, the base 345 of which is indicated by the dot-and-dash lines in Fig. 1.

As shown in Figs. 8, 9 and 11, the aperture 343 is formed of two relatively different diameters and consequently provides a convenient annular shoulder 346 upon which the enlarged body 347 of the saliva ejector 337 may normally rest when not in use, with its flexible connecting tube 336 loped as particularly illustrated in Fig. 8.

The pipe 306 conveys water from the valve block or body 303 to the water heater reservoir 350 and is removably connected with its inlet nipple 352 by the connection fitting nut 353. The water after being heated by contact with the electrical heating element 355 within the water heater reservoir 350 is discharged therefrom through the nipple 356 and pipe 357 which is connected therewith by the connection fitting 360, and is directed into the bottom of the valve 361 as shown in Fig. 10.

The flow of warmed water from the water heater 350 is controlled by the valve 361 to which said water heater 350 is connected by the pipe 357 and said flow is arranged to be regulated by the manipulation of the controlling knob 362, which not only controls the flow of warmed water through the outlet fitting 363 of the two-way valve 361, of well known construction, but is also arranged to control the flow of water of normal temperature, or what is generally termed cold water, through said outlet. The cold water is supplied to the valve 361 through the pipe 365 which connects said valve with an upwardly extended branch outlet fitting 366 in the nipple 352, and bypasses the water heater 350, as best shown in Fig. 9.

The valve outlet fitting 363 is connected by the looped flexible tube 369 with the water syringe 370, of well known construction, which, as best illustrated in Fig. 8, is normally supported by the cylindrical water syringe warming holder 371 comprising the outer cylindrical casing 372, which is attached to the boss 194 on the frame plate 193 and projects upwardly from the top wall 275 of the cuspidor supporting arm casing comprising the casing sections 272 and 273.

As illustrated in Fig. 8, the lower or inner portion 375 of the syringe body 376 depends into the bore 377 of said syringe warming holder 371, and said syringe may be freely withdrawn therefrom for use in directing water into the patient's mouth, such withdrawal causes the looped flexible tubing to be drawn upwardly through the bore 377 of the syringe warming holder 371 until the weighted stop 379, which is adjustably disposed on the flexible tube 369, abuts against the lower end of the inner cylindrical concentric tube 380 of said warming holder, see Figs. 15 and 16.

Said weighted stop not only serves to limit the length of flexible tube 369 that may be withdrawn through the bore 377, but also tends when the tube is substantially fully extended, to serve, by its weight, to automatically retrieve said flexible tube when the operator relieves the pull thereon in his effort to replace the syringe 370 in its holder 371.

As shown in Fig. 16, the inner cylindrical tube 380 of the syringe warming holder 371 depends through the aperture 382 in the boss 194 and is provided intermediate of its length with the annular attaching flange 383 which rests upon the heat insulating washer 385 on the top wall 275 of the casing section 372 and is secured to said annular boss 194 on the plate 193 by the screws 386 and 387 extended through suitably alined apertures in said flange 383, in said top wall 275 and into suitably provided apertures 389 and 390 in said annular boss 194, being rigidly secured therein by threaded engagement with the headed bushings 392 and 393 extended upwardly into said apertures 389 and 390.

The upper end of the tube 380 is externally threaded and has the cap ferrule 395 threadedly engaged therewith and is also in threaded engagement with the upper end of the outer cylindrical casing 372, the lower end of which terminates in the enlarged base 396 which embraces the flange 383 and conveniently conceals the heads of the screws 386 and 387.

As shown in Fig. 15, the annular space between the outer cylindrical casing 372 and the inner cylindrical tube 380 is arranged to receive the heating element 399 including the leading-in wires 400 and 401 which are protected from accidental contact with said casing 372 and tube 380 by the sleeves 402 and 403 formed of insulation material.

The wires 400 and 401 extend downwardly through the apertures 405 and 406 in the flange and through the aperture 382 in the boss 194 and top plate 193 of the cuspidor supporting arm frame, and said wires 400 and 401 extend outwardly through said frame and casing to the binding screws 409 and 410 respectively on the relatively separated metal connection plates 412 and 413 which are mounted on the bracket 415 secured to the outer rim margin of the top plate 193 by the screws 416.

The connection plates 412 and 413 are respectively provided with the binding screws 419 and 420 which are connected by the wires 422 and 423 with the electric heating element 355 which extends into the water heater reservoir 350 but which has its wire connection means projecting slightly outward from the forward end of said water heater reservoir, said electric heating element being secured in the water heater reservoir by the nut 425.

As shown in Fig. 9, electric current is supplied to the connection plates 412 and 413 by the wires 426 and 427 which are connected to the binding screws 429 and 430 and lead therefrom through the cuspidor supporting arm and upwardly through the pedestal structure and through the voltage control switch 459, see Fig. 2, downwardly to the transformer 431 which is disposed in the water niche and cuspidor mounting section 3, as shown in Fig. 7.

The temperature control switch 459 is thus arranged to control the temperature of the water in the water heater reservoir 350 which is disposed within the cuspidor arm, and also in the water syringe holder 371. The temperature of the water may be increased in varying degrees by turning the control knob 460 of said switch in clockwise direction from the off position.

However, if it is desired that cold water be delivered through the syringe 370, the valve controlling knob is turned to shut off the warm water directed from the water heater reservoir 350 through the pipe 357, and is actuated to open the by-pass pipe 365 to permit water from the cold water supply pipe 306 to be directed thereby to the syringe.

Water may be completely shut off from both the water heater reservoir 350 and the syringe 370 by the valve 308 which depends from the valve block or body 303 and is arranged to control the flow of water from said block through the pipe 306 to said water heater reservoir 350.

The supporting standard which is composed of the several frame sections 1, 2, 3, 4 and 5 is encased in a housing formed of a plurality of semicylindrical housing or casing sections which may be readily assembled and removed and which are so yieldingly retained in assembled relation to form the pedestal structure.

As shown in Fig. 3, the base flange 6 is encased by the complementary semi-annular base flange housing sections 550 upon which the semicylindrical base housing sections 551 having the opposed inturned lateral edge flanges 552 are superposed. The opposite semicylindrical margins 553 and 554 of said housing sections 551 are inset, see Fig. 4, and form regions of reduced diameter in the pedestal of the assembled structure, as illustrated in Fig. 2.

That portion of the pedestal comprising the complementary semicylindrical housing sections 555 that encase the main body frame section 2 is shown in Figs. 3 and 7 and is typical of the several housing sections that comprise the pedestal casing structure, said housing sections 555 each having opposed inturned flanges 556 and 557, the flange 556 of each of the housing sections 555 being interrupted by the semicircular recesses 559 and 560 which cooperate to form circular apertures, through which the valves 665 and 116 project, as best shown in Fig. 6, when the complementary housing sections 555 are assembled with said flanges 556 and 557 in relatively abutted relation.

As best shown in Fig. 6, the housing sections 555 have their flanges 556 and 557 reduced in width at their upper and lower ends to provide the restricted regions 561 and 562 which are engaged in the notches 35 and 36 in the flanges 21 and 22 respectively. Said sections 555 are inset below the flange 21 and above the flange 22 to provide the reduced semicircular end margins 563 and 564 which, as shown in Fig. 2, cooperate to form regions of reduced diameter in the assembled structure.

The upper or water niche portion of the cuspidor and water niche frame section 3 is arranged to be encased by the housing sections 566 and 567 respectively having the relatively abutted inturned lateral marginal flanges 568 and 569, as best shown in Fig. 12, which are arranged to be detachably engaged in the notches 52 disposed in diametrically opposite relation in the flange 39.

As best shown in Figs. 7 and 12, the forward housing section 567 is provided with the substantially rectangular aperture 570, the edge margins of which are protected by the channeled frame 571 through which aperture the water niche basin 163 projects forwardly and which readily permits withdrawal and replacement therethrough of the water glass or tumbler 165, normally resting upon the drain cover plate 166, as shown in Fig. 7, said tumbler being shown in dot-and-dash lines for convenience of illustration.

Similarly, the motor or dome frame section 5 is encased by the complementary semicylindrical housing sections 572 and 573 and the upper semicircular margins 578 of the housing sections 572 and 573 are inset and overlap the inset margins 580 of the semi-annular dome or cap housing sections 582 and 583 which have the relatively abutted inturned flanges 585 and terminate short of the semicircular inner edges 586 of the respective dome or cap housing sections 582 and 583.

As shown in Fig. 3, the inner edge margins of the horizontal top wall of said dome or cap housing sections 582 and 583 overlap and rest upon the annular head 69 at the top of the dome or motor frame section 5.

The housing thus described is capped by the annular crown plate 589, see Fig. 3, which is slightly arched, having its outer peripheral edge 590 curved downwardly and engaging the upper wall of the dome or cap housing comprising the housing sections 582 and 583, and having its inner rim 591 curved upwardly and engaging the under surface of the enlarged central portion of the spacer sleeve 74, by which it is retained in its proper position to cover the pocket 70.

As shown in Figs. 1 and 2, the frame of the bracket table arm 97 is arranged to be encased in the readily removable and replaceable bracket table housing or casing sections including the main housing section 592, the substantially semicircular inner end section 593, and the substantially semi-circular outer end section 594.

As shown in Fig. 2, the several regions of reduced diameter in the pedestal casing are encircled by the girdling bands 519, 520, 521, 522, 523, 524 and 525, not only serving as a means of utility but of ornamentation.

My invention has many advantages over similar devices as heretofore constructed for supporting parts and accessories in convenient position for use by the professional operator, and affords not only easy access for use, but facilitates access for adjustment, repairs and replacement of all of said parts, and is particularly adapted for eliminating parts that may not be desired by individual operators and the substitution or addition of parts and accessories that may be desired, by other operators, and, in this particular respect, it is possessed of individual flexibility and consequent superiority.

I do not desire to limit my invention to the precise details of construction and arrangement as herein set forth, as it is obvious that various modifications may be made therein without departing from the essential features of my invention as defined in the appended claims.

Having thus described my invention, I claim:

1. A dental equipment assemblage comprising a plurality of separable frame sections mounted one upon the other in coaxial relation and having flanges and a slideway, a cuspidor supporting frame having a semi-circular groove adapted to engage said slideway, means arranged to maintain said cuspidor supporting frame engaged with said slideway and to permit the said cuspidor supporting frame to be moved horizontally about the common axis of the several frame members, a casing for said frame members comprising a plurality of relatively separable sections formed of thin material arranged to be engaged with said frame members to enclose them in stationary relation, and a casing for said cuspidor supporting frame comprising a plurality of relatively separable sections enclosing said frame and movable therewith relative to the sections which enclose the said frame members.

2. A dental equipment assemblage comprising a supporting standard structure formed of a plurality of frame sections assembled one upon another about a unitary axis, a cuspidor supporting arm mounted to embrace said standard and to revolve about said axis, a cuspidor mounted on said arm, a water distributor carried by said arm and connected with said cuspidor, means arranged to control the flow of water through said distributor, a waste conduit extending through said structure and arm and connecting said cuspidor with a waste outlet and including a swivelled joint to permit the free movement of said cuspidor while discharging waste through said conduit to said outlet, a water supply pipe leading through said standard structure and arm and connecting said distributor with a source of water supply and having an intermediate flexible dependingly looped section permitting free movement of said arm including said distributor and cuspidor with which it is connected, and having the inlet and outlet of said flexible looped section superposed with respect to the looped portion.

3. A dental equipment assemblage comprising a supporting standard structure formed of a plurality of frame sections assembled about a unitary axis and having an annular projection, an accessory supporting arm projecting radially from said structure and arranged to revolve about said axis and having its inner portion embracing said annular projection, means tending to maintain said arm operatively engaged with said annular projection, a conduit leading water through said arm to the accessories thereon, a casing for said standard structure having an opening affording a walled niche therein, a tumbler supporting drip basin forming the base of said niche, a drain fixture having a pocket arranged to receive the waste from said basin, and also having a projection forming a valve having a seat, inlet and outlet orifices leading into said valve and respectively connecting water supply with an outlet fixture disposed in position to direct water into a tumbler that may be disposed in said basin, and a valve plug cooperative with said seat to control the flow of water through said outlet fixture, and having means extending through said casing whereby it may be manually operated, and means common to said arm and niche arranged to control the flow of water to said conduit and inlet.

4. A dental equipment assemblage comprising a supporting standard structure formed of a plurality of frame sections assembled about a unitary axis and having an annular projection, an accessory supporting arm projecting radially from said structure and arranged to revolve about said axis and having its inner portion embracing said annular projection, means tending to maintain said arm operatively engaged with said annular projection, a casing for said standard structure having a lateral opening affording a walled niche therein, a tumbler supporting drip basin forming the bottom of said niche, a fluid passageway leading water through said arm to the accessories carried thereby, a drain fixture having a pocket connecting said drip basin with a drain outlet, and having a valve provided with a chamber having inlet and outlet passageways respectively leading water from a water supply to a tumbler in said basin, and means comprising a valve in said water supply, common to said arm and niche arranged to control the flow of water to said conduit and chamber.

5. A dental equipment assemblage comprising a supporting standard structure formed of a plurality of frame sections assembled about a unitary axis and having an annular projection, an accessory supporting arm projecting radially from said structure and arranged to revolve about said axis and having its inner portion embracing said annular projection, means tending to maintain said arm operatively engaged with said annular projection, a water passageway leading water through said arm to the accessories carried thereby, a casing for said standard structure having a niche recessed therein, a tumbler supporting drip basin forming the bottom of said niche, a valve body including a chamber having inlet and outlet passageways respectively leading water from a source of water supply to the tumbler in said basin and also including a receptacle arranged to receive the drip from said basin and direct it through a suitable connection to a waste outlet, a valve plug arranged to control the water passing through said chamber and having means extending through said casing by which said plug may be manually actuated, and a valve common to said arm and niche arranged to control the flow of water from said source of supply to said passageway and said inlet.

6. A dental equipment assemblage comprising a supporting standard, a movable support mounted to turn about the axis of said standard, a water supply conduit leading through said standard and into said movable support, a syringe holder carried by said movable support, means arranged to maintain said holder heated, a syringe normally supported by said holder, a flexible conveyer connecting said syringe and conduit and affording freedom of movement of said syringe, and a weighted stop arranged to limit the withdrawal movement of said conveyor through said holder, and to effect its retraction.

ROBERT C. ANGELL.